(12) United States Patent
Yamashima et al.

(10) Patent No.: US 8,125,900 B2
(45) Date of Patent: Feb. 28, 2012

(54) NETWORK EQUIPMENT MANAGEMENT DEVICE, NETWORK EQUIPMENT MANAGEMENT METHOD, NETWORK EQUIPMENT, AND PROGRAM USED THEREIN

(75) Inventors: Hiroyuki Yamashima, Kawasaki (JP); Toshihiko Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 11/776,811

(22) Filed: Jul. 12, 2007

(65) Prior Publication Data

US 2007/0258369 A1 Nov. 8, 2007

Related U.S. Application Data

(63) Continuation of application No. PCT/JP2005/001121, filed on Jan. 27, 2005.

(51) Int. Cl.
*H04L 12/26* (2006.01)

(52) U.S. Cl. ........ 370/230; 370/254; 370/241; 370/404; 709/220; 709/223; 709/224

(58) Field of Classification Search .................. 709/220, 709/223, 203, 224
See application file for complete search history.

(56) References Cited

U.S. PATENT DOCUMENTS 5,491,690 A * 2/1996 Alfonsi et al. ................ 370/404

(Continued)

FOREIGN PATENT DOCUMENTS

JP 2000-067021 3/2000

(Continued)

OTHER PUBLICATIONS

"International Preliminary Report on Patentability (Written Opinion)," (IPRP) in corresponding PCT App. No. PCT/JP2005/001121, mailed Jul. 31, 2007, Full English Translation.

(Continued)

*Primary Examiner* — Ricky Ngo
*Assistant Examiner* — Rasheed Gidado
(74) *Attorney, Agent, or Firm* — Fujitsu Patent Center

(57) ABSTRACT

In order to perform update processing with high reliability while preventing occurrence of an error in the update order, reduce a load on a management device, and reduce the time required to complete the update processing, according to the present invention, there is provided a network equipment management program that allows a computer to execute: an order information creation step that creates order information which is information corresponding to the order of the network equipments in which setting information is to be set and according to which the setting information is sequentially transmitted from N (N=1, 2, . . . )-th network equipment to (N+1)-th network equipment so as to be set in the respective network at its reception timing of the setting information; and a transmission step that transmits predetermined information including the order information created in the order information creation step to a first network equipment specified in the order information.

12 Claims, 18 Drawing Sheets

U.S. PATENT DOCUMENTS

| | | | |
|---|---|---|---|
| 5,872,928 A * | 2/1999 | Lewis et al. | 709/222 |
| 6,339,790 B1 * | 1/2002 | Inoue | 709/224 |
| 6,490,617 B1 * | 12/2002 | Hemphill et al. | 709/223 |
| 6,532,491 B1 * | 3/2003 | Lakis et al. | 709/223 |
| 6,876,850 B2 * | 4/2005 | Maeshima et al. | 455/422.1 |
| 7,039,674 B1 * | 5/2006 | Cha | 709/203 |
| 7,203,739 B2 * | 4/2007 | Ohto et al. | 709/219 |
| 7,386,609 B2 * | 6/2008 | Hwang et al. | 709/223 |
| 2002/0009056 A1 | 1/2002 | Kanehara | 370/255 |
| 2002/0052938 A1 * | 5/2002 | Kanemitsu | 709/220 |
| 2002/0055996 A1 * | 5/2002 | Sugauchi et al. | 709/223 |
| 2002/0162110 A1 * | 10/2002 | Wakimoto et al. | 725/87 |
| 2003/0105844 A1 * | 6/2003 | Hada et al. | 709/220 |
| 2003/0115314 A1 * | 6/2003 | Kawashima | 709/224 |
| 2005/0025070 A1 * | 2/2005 | Yamada | 370/254 |

FOREIGN PATENT DOCUMENTS

| | | |
|---|---|---|
| JP | 2001-092641 | 4/2001 |
| JP | 2002-26973 | 1/2002 |
| JP | 2002-055894 | 2/2002 |
| JP | 2002-084310 | 3/2002 |
| JP | 2003-134136 | 5/2003 |
| JP | 2004-064648 | 2/2004 |
| JP | 2004-193681 | 7/2004 |

OTHER PUBLICATIONS

"Japanese Office Action" mailed by JPO and corresponding to Japanese application No. 2007-500382 on May 11, 2010, with English translation.

* cited by examiner

FIG.13

TRANSMISSION INFORMATION 41

MANAGEMENT DEVICE → CENTER → NETWORK EQUIPMENT A → NETWORK EQUIPMENT B → NETWORK EQUIPMENT C

| CENTER SETTING INFORMATION VERSION No | EQUIPMENT A SETTING INFORMATION VERSION No | EQUIPMENT B SETTING INFORMATION VERSION No | EQUIPMENT D SETTING INFORMATION VERSION No |
|---|---|---|---|

TRANSMISSION INFORMATION 42

MANAGEMENT DEVICE → CENTER → NETWORK EQUIPMENT A → NETWORK EQUIPMENT C → NETWORK EQUIPMENT F

| CENTER CONFIRMATION INFORMATION VERSION No | EQUIPMENT A CONFIRMATION INFORMATION VERSION No | EQUIPMENT C SETTING INFORMATION VERSION No | EQUIPMENT F SETTING INFORMATION VERSION No |
|---|---|---|---|

TRANSMISSION INFORMATION 43

MANAGEMENT DEVICE → CENTER → NETWORK EQUIPMENT G → NETWORK EQUIPMENT I → NETWORK EQUIPMENT K → NETWORK EQUIPMENT L
↗ NETWORK EQUIPMENT J

| CENTER CONFIRMATION INFORMATION VERSION No | EQUIPMENT G CONFIRMATION INFORMATION VERSION No | EQUIPMENT I CONFIRMATION INFORMATION VERSION No | EQUIPMENT K SETTING INFORMATION VERSION No | EQUIPMENT L SETTING INFORMATION VERSION No |
|---|---|---|---|---|

TRANSMISSION INFORMATION 44

MANAGEMENT DEVICE → CENTER → NETWORK EQUIPMENT G → NETWORK EQUIPMENT J → NETWORK EQUIPMENT K

| CENTER CONFIRMATION INFORMATION VERSION No | EQUIPMENT G CONFIRMATION INFORMATION VERSION No | EQUIPMENT J SETTING INFORMATION VERSION No | EQUIPMENT K CONFIRMATION INFORMATION VERSION No |
|---|---|---|---|

FIG.15

| INFORMATION TYPE IDENTIFIER | IDENTIFIER OF EQUIPMENT AT BRANCH POINT | IDENTIFIER OF NEXT TRANSMISSION DESTINATION EQUIPMENT | BRANCH COUNTER AT ONE EQUIPMENT |
|---|---|---|---|

MANAGEMENT INFORMATION (BRANCH)

| INFORMATION TYPE IDENTIFIER | IDENTIFIER OF TRANSMISSION SOURCE EQUIPMENT | IDENTIFIER OF NEXT TRANSMISSION DESTINATION EQUIPMENT | MERGE INFORMATION |
|---|---|---|---|

MANAGEMENT INFORMATION (TRANSMISSION)

| INFORMATION TYPE IDENTIFIER | IDENTIFIER OF EQUIPMENT AT MERGE POINT | IDENTIFIER OF NEXT TRANSMISSION DESTINATION EQUIPMENT | IDENTIFIERS OF EQUIPMENTS TO BE MERGED | IDENTIFIERS OF EQUIPMENTS TO BE MERGED | ... |
|---|---|---|---|---|---|

MANAGEMENT INFORMATION (MERGE)

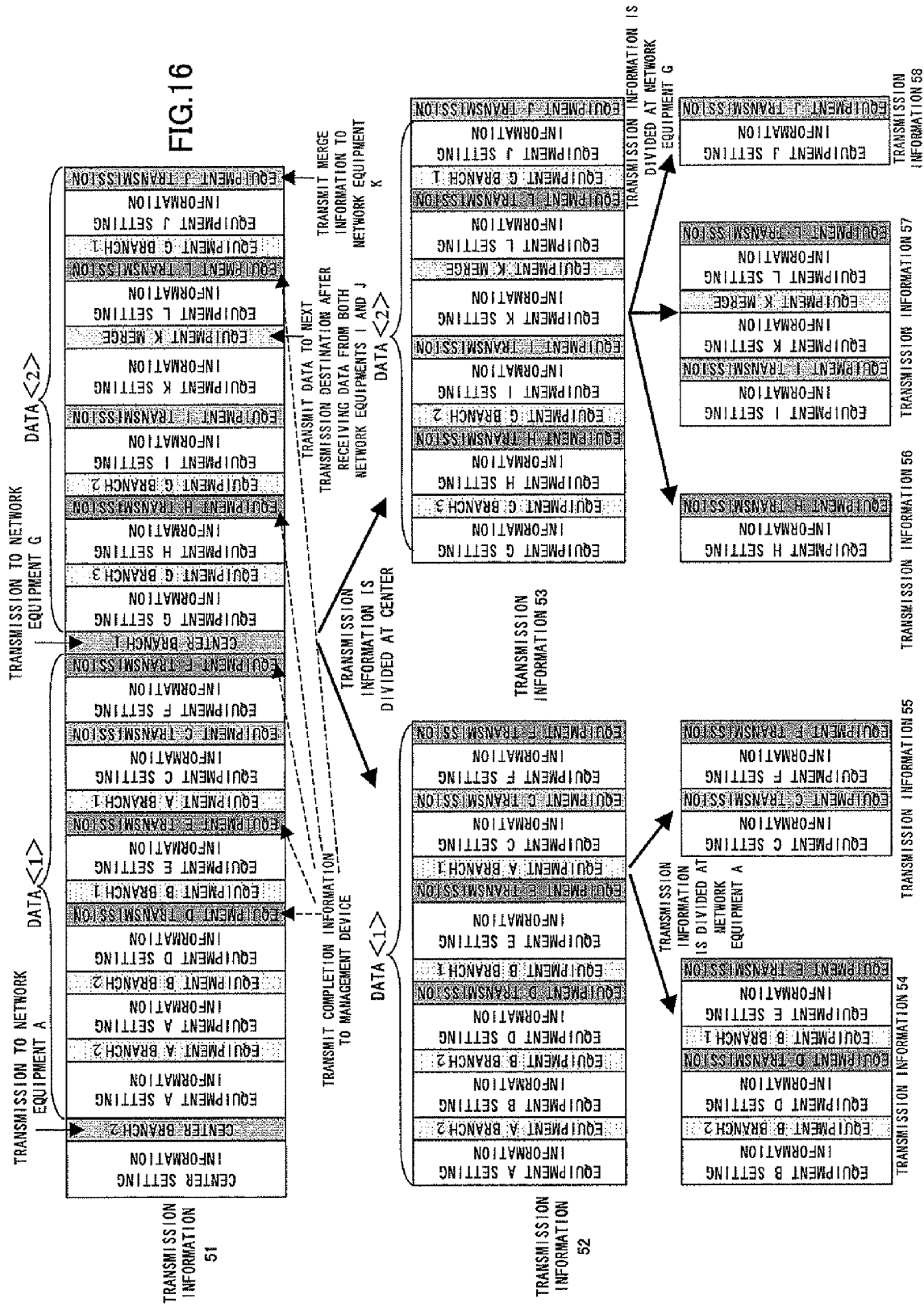

NETWORK EQUIPMENT MANAGEMENT DEVICE, NETWORK EQUIPMENT MANAGEMENT METHOD, NETWORK EQUIPMENT, AND PROGRAM USED THEREIN

This is a continuation application, filed under 35 U.S.C. §111(a), of International Application No. PCT/JP2005/001121, filed Jan. 27, 2005, the disclosure of which is herein incorporated in its entirety by reference.

TECHNICAL FIELD

The present invention relates to a network equipment management device, a network equipment management method, a network equipment, a network equipment management program, and an information setting program for a network equipment that realize a system in which a plurality of network equipments connected to a network can set setting information transmitted from a network equipment management device in a predetermined order.

BACKGROUND ART

When update of setting information of respective network equipments connected to a network and constituting a service in cooperation with each other are to be performed, the update for the respective equipments needs to be performed according to the predetermined order. Otherwise, the update processing may not operate properly depending on the type of the service or content of new setting information.

There is known a method for performing such update processing for network equipments. In this method, as shown in FIG. 17, a network equipment management device 101 transmits new setting information to network equipment so as to update the setting information thereof. Then, the network equipment management device 101 transmits the new setting information to network equipment so as to update the setting information thereof. In this manner, the network equipment management device 101 repeats the update processing according to a predetermined order to thereby update the setting information of all network equipments.

There is known another method in which, as shown in FIG. 18, timers S110, S113, and S116 are set in respective network equipments according to their update order, and respective network equipments access the network equipment management device 101 based on the count result of the timers so as to acquire new setting information for their update.

DISCLOSURE OF INVENTION

Object to be Achieved by the Invention

However, in such conventional arts, the management device communicates with all the network equipments. This results in an increase in a load on the management device as well as causes a large time lag between the network equipments during the update processing with the result that operating efficiency of the entire system is deteriorated.

Further, along with an increase in the number of network equipments, it takes a considerably long time from the start of the update processing for all the network equipments until the completion of the update processing therefor, thus deteriorating the system operating efficiency.

Further, if the measurement values of the timers set in the network equipments include some error, the update processing cannot be performed in the proper order.

The present invention has been made to solve the above-mentioned problem, and an object thereof is to provide a network equipment management device, a network equipment management method, a network equipment, a network equipment management program, and an information setting program for a network equipment capable of performing update processing with high reliability while preventing occurrence of an error in the update order, reducing a load on the management device, and reducing the time required to complete the update processing.

To solve the above problem, according to a first aspect of the present invention, there is provided a network equipment management device that can be connected, through a network, to a plurality of network equipments connected to the network and allows the plurality of network equipments to set setting information according to a predetermined order, comprising: an order information creation section that creates order information which is information corresponding to the order of the network equipments in which the setting information is to be set and according to which the setting information is sequentially transmitted from N (N=1, 2, . . . )-th network equipment to (N+1)-th network equipment so as to be set in the respective network equipments at its reception timing of the setting information; and a transmission section that transmits predetermined information including the order information created in the order information creation section to a first network equipment specified in the order information.

In the network equipment management device, the predetermined information includes setting information to be set in the respective network equipments together with the order information. Further, the network equipment management device comprises a common setting information transmission section that transmits, by multicast, common setting information to be set in common to the plurality of network equipments thereto, wherein the predetermined information includes individual setting information to be individually set in the network equipments together with the order information.

Further, in the network equipment management device, if there are any branches in a management tree of a network (network equipment management tree), the order information is created in correspondence with a plurality of routes formed by the branches. Further, in the network equipment management device, in order to confirm/determine the information reception order of the respective network equipments, the order information includes at least either one of branch information concerning a network equipment installed at the branch point in the network equipment management tree and branch definition and merge information concerning a network equipment installed at the merge point in the network equipment management tree and merge definition.

Further, according to a second aspect of the present invention, there is provided a network equipment management device that can be connected, through a network, to a plurality of network equipments connected to the network and allows the plurality of network equipments to set setting information according to a predetermined order, comprising: an order information creation section that creates order information which is information corresponding to the order of the network equipments in which the setting information is to be set and according to which trigger information for setting the setting information is sequentially transmitted from N (N=1, 2, . . . )-th network equipment to (N+1)-th network equipment; and a transmission section that transmits predetermined information including the order information created in the order information creation section to the plurality of network equipments as well as transmits, to a first network equipment, trigger transmission timing information for sequentially transmitting the trigger information to the subsequent network equipments according to the order information.

In the network equipment management device, the trigger transmission timing information is formed at the timing at which common setting information to be set in common to the plurality of network equipments is transmitted to the first network equipment, and the trigger information is constituted by the common setting information. Alternatively, the trigger transmission timing information includes timer activation information for activating a timer in the first network equipment to allow the first network equipment to transmit, based on a count result of the timer, the trigger information to a second network equipment.

Further, according to a third aspect of the present invention, there is provided a network equipment management program allowing a computer that can be connected, through a network, to a plurality of network equipments connected to the network to allow the plurality of network equipments to set setting information according to a predetermined order, the program allowing a computer to execute: an order information creation step that creates order information which is information corresponding to the order of the network equipments in which the setting information is to be set and according to which the setting information is sequentially transmitted from N (N=1, 2, . . . )-th network equipment to (N+1)-th network equipment so as to be set in the respective network equipments at its reception timing of the setting information; and a transmission step that transmits predetermined information including the order information created in the order information creation step to a first network equipment specified in the order information.

The network equipment management program comprises a common setting information transmission step that transmits, by multicast, common setting information to be set in common to the plurality of network equipments thereto, wherein the predetermined information includes individual setting information to be individually set in the network equipments together with the order information.

Further, according to a fourth aspect of the present invention, there is provided a network equipment management program allowing a computer that can be connected, through a network, to a plurality of network equipments connected to the network to allow the plurality of network equipments to set setting information according to a predetermined order, the program allowing a computer to execute: an order information creation step that creates order information which is information corresponding to the order of the network equipments in which the setting information is to be set and according to which trigger information for setting the setting information is sequentially transmitted from N (N=1, 2, . . . )-th network equipment to (N+1)-th network equipment; and a transmission step that transmits predetermined information including the order information created in the order information creation step to the plurality of network equipments as well as transmits, to a first network equipment, trigger transmission timing information for sequentially transmitting the trigger information to the subsequent network equipments according to the order information.

Further, according to a fifth aspect of the present invention, there is provided a network equipment that can set setting information transmitted directly or through another network equipment from a network equipment management device to which the network equipment can be connected through a network, comprising: an order information extraction section that extracts order information specifying the order of the network equipment that sets the setting information from information received from the network equipment management device or network equipment; a determination section that determines the validity of the transmission source that transmits information to the own network equipment based on the order information extracted by the order information extraction section; an information setting section that sets the setting information transmitted from the network equipment management device in the case where the determination result of the determination section is affirmative; and a transmission section that transmits information including the order information to the next network equipment according to the order information.

The network equipment comprises an order information deletion section that deletes, from the order information received from the network equipment management device or network equipment, information concerning the network equipment management device or network equipment that has transmitted the order information to own equipment and transmits the resultant order information to the next network equipment.

The network equipment comprises a setting information deletion section that deletes, from setting information, a data part of the setting information to be set only in the own equipment in the case where the setting information concerning a plurality of network equipments is transmitted together with the order information and transmits the resultant setting information to the next equipment.

Further, according to a sixth aspect of the present invention, there is provided a network equipment that can set setting information transmitted directly or through another network equipment from a network equipment management device to which the network equipment can be connected through a network, comprising: a determination section that determines the validity of the transmission source specified in trigger information received from the network equipment management device or another network equipment based on order information which is received from the network equipment management device and specifies the transmission order of the trigger information which is transmitted, according to the order of the plurality of network equipments that set the setting information, directly or through another network equipment from the network equipment management device; an information setting section that sets the setting information transmitted from the network equipment management device based on the trigger information in the case where the determination result of the determination section is affirmative; and a transmission section that transmits the trigger information to the next network equipment according to the order information.

Further, according to a seventh aspect of the present invention, there is provided an information setting program for a network equipment, allowing a computer constituting a network equipment to set setting information transmitted directly or through another network equipment from a network equipment management device to which the computer can be connected through a network, the program allowing the computer to execute: an order information extraction step that extracts order information specifying the order of the network equipment that sets the setting information from information received from the network equipment management device or network equipment; a determination step that determines the validity of the transmission source that transmits information to the own network equipment based on the order information extracted by the order information extraction step; an information setting step that sets the setting information transmitted from the network equipment management device in the case where the determination result of the determination step is affirmative; and a transmission step that transmits information including the order information to the next network equipment according to the order information.

Further, according to an eighth aspect of the present invention, there is provided an information setting program for a network equipment, allowing a computer constituting a network equipment to set setting information transmitted directly or through another network equipment from a network equipment management device to which the computer can be connected through a network, the program allowing the computer to execute: a determination step that determines the validity of the transmission source specified in trigger information received from the network equipment management device or another network equipment based on order information which is received from the network equipment management device and specifies the transmission order of the trigger information which is transmitted, according to the order of the plurality of network equipments that set the setting information, directly or through another network equipment from the network equipment management device; an information setting step that sets the setting information transmitted from the network equipment management device based on the trigger information in the case where the determination result of the determination section is affirmative; and a transmission step that transmits the trigger information to the next network equipment according to the order information.

Further, according to a ninth aspect of the present invention, there is provided a network equipment management method that sequentially sets setting information in a plurality of network equipments connected to the network equipment management device through a network according to a predetermined order, comprising: a step in which the network equipment management device sets the order according to which the plurality of network equipments set setting information therein and the order is transmitted as order information to a first network equipment; and a step in which the first network equipment sets the setting information therefor and transmits the order information according to the order information to a second network equipment to allow the second network equipment to set the setting information therefor.

BRIEF DESCRIPTION OF DRAWINGS

FIG. 13 is a view showing an example of a configuration of the transmission information according to the present invention;

FIG. 15 is a view showing an example of a configuration of management information according to the present invention;

FIG. 16 is a view showing an example of a configuration of the transmission information according to the present invention;

BEST MODE FOR CARRYING OUT THE INVENTION

Embodiments of the present invention will be described below with reference to the accompanying drawings.

First Embodiment

Figure 1:
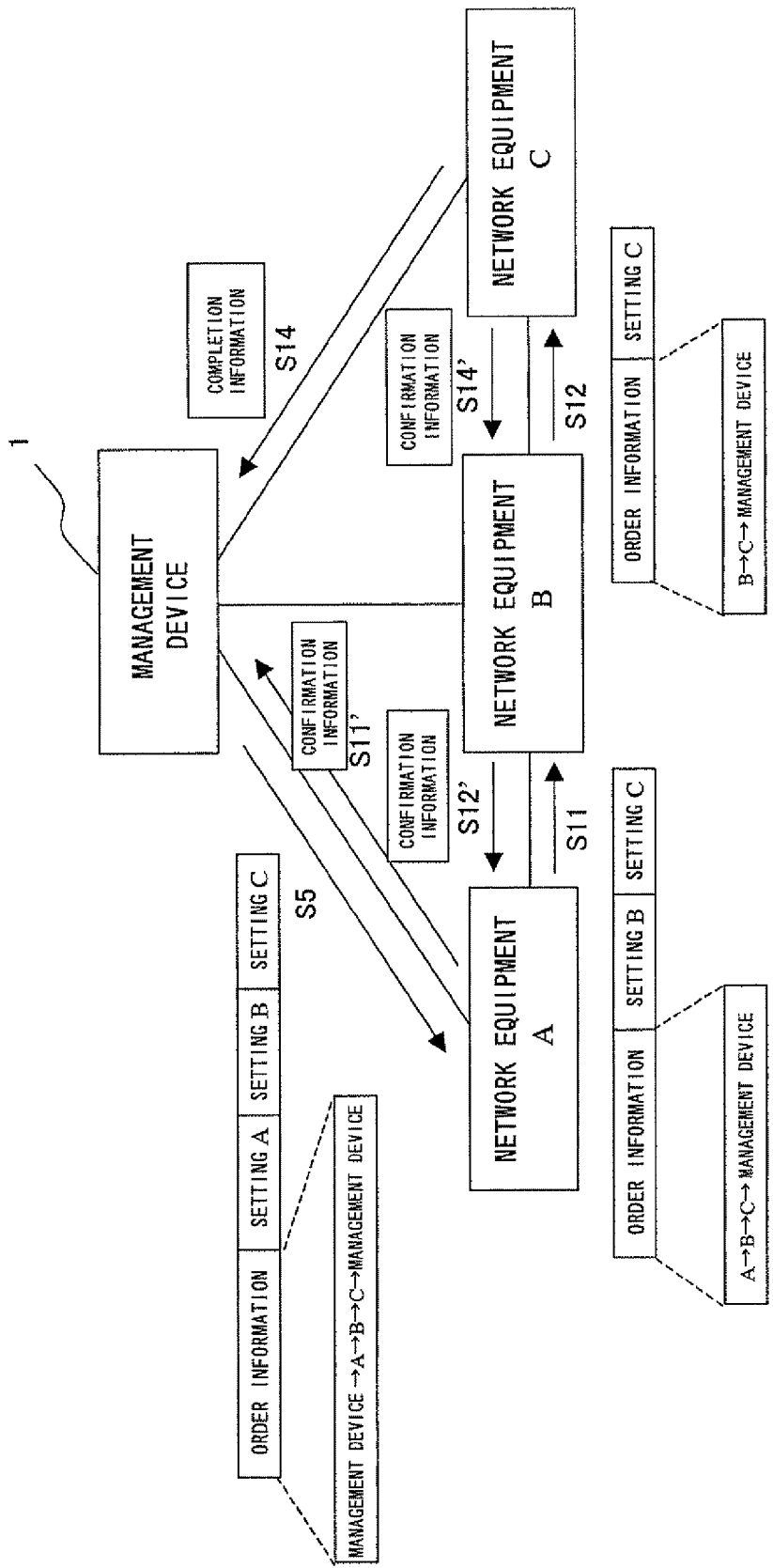
FIG. 1 is a block diagram showing an example of a configuration of a network equipment management system according to the present invention.

FIG. 1 is a block diagram showing an example of a configuration of a network equipment management system according to a first embodiment of the present invention. The network equipment management system shown in FIG. 1 includes a network equipment management device 1 (hereinafter, referred to merely as "management device 1") and network equipments A, B, and C.

Figure 2:
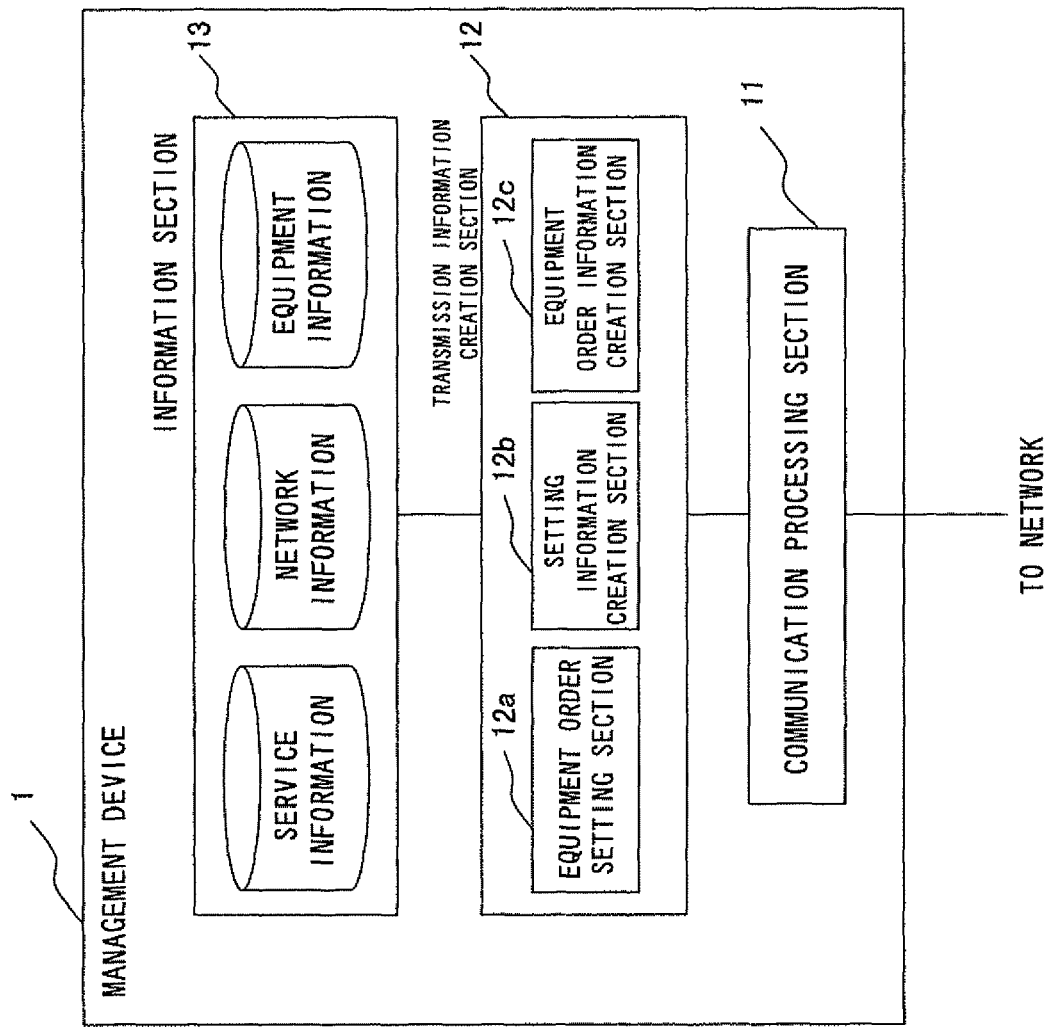
FIG. 2 is a block diagram showing an example of a configuration of a network equipment management device according to the present invention.

FIG. 2 is a block diagram showing an example of a configuration of the management device 1 of FIG. 1. The management device 1 includes a communication processing section (transmission section) 11, a transmission information creation section 12, and an information section 13. The transmission information creation section 12 includes an equipment order setting section 12a, setting information creation section 12b, and an equipment order information creation section 12c.

Figure 3:
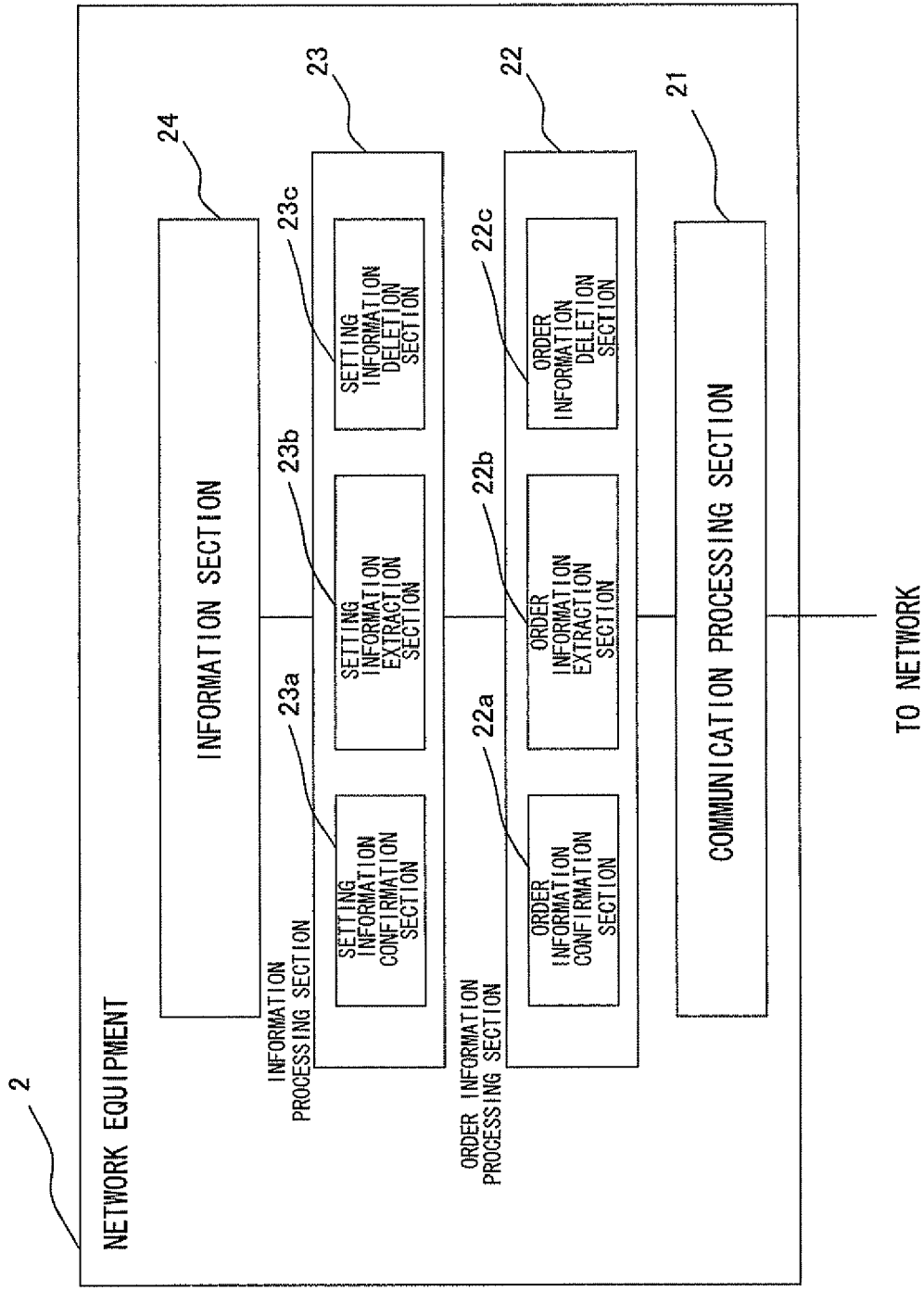
FIG. 3 is a block diagram showing an example of a configuration of a network equipment.

FIG. 3 is a block diagram showing an example of a configuration of the network equipments A, B, or C (hereinafter referred to collectively as "network equipment 2" for simplicity of description). The network equipment 2 includes a communication processing section 21, an order information processing section 22, an information processing section 23, and an information setting section 24. The order information processing section 22 includes an order information confirmation section 22a, an order information extraction section 22b, and an order information deletion section 22c. The information processing section 23 includes a setting information confirmation section 23a, a setting information extraction section 23b, and a setting information deletion section 23c.

Figure 4:
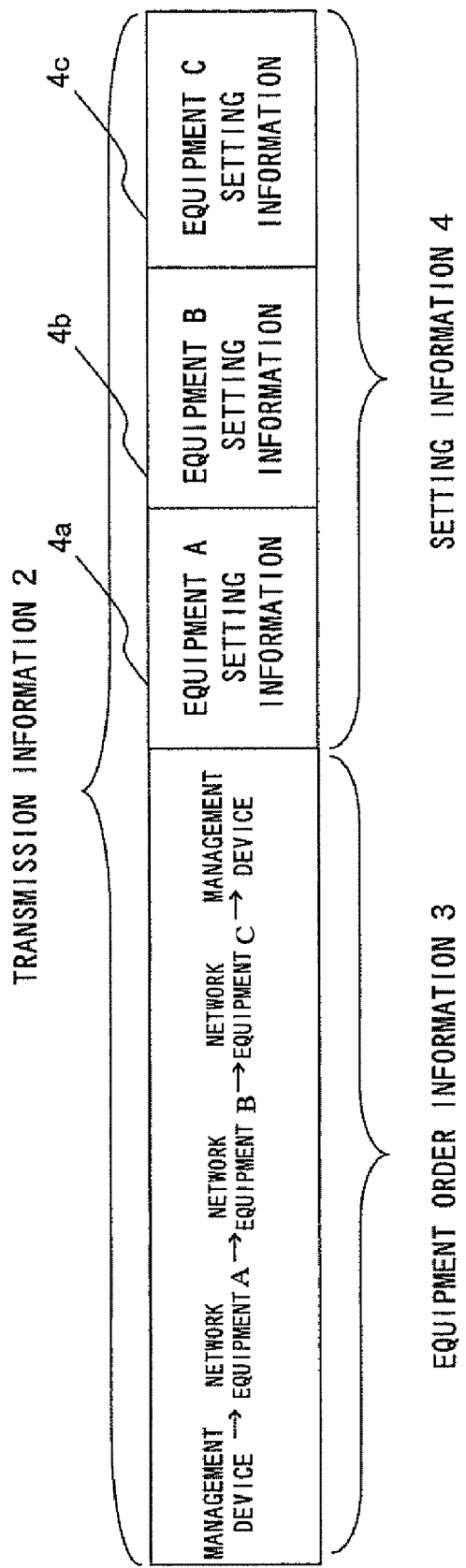
FIG. 4 is a view showing an example of a configuration of transmission information according to the present invention.
Figure 5:
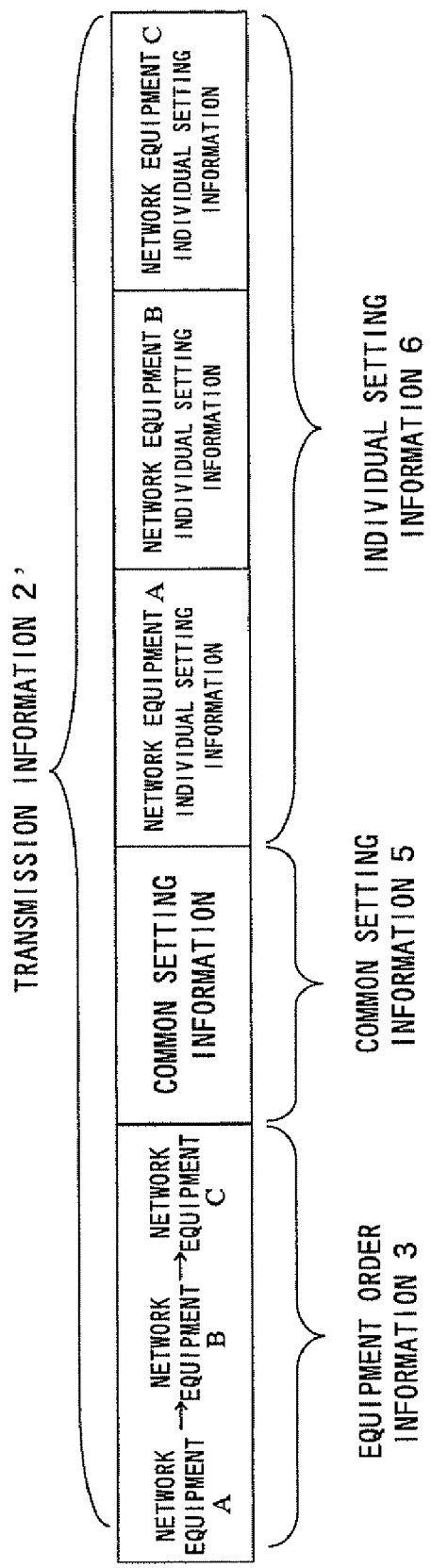
FIG. 5 is a view showing an example of a configuration of transmission information according to the present invention.

FIGS. 4 and 5 are views each showing an example of a configuration of transmission information transmitted from the management device 1 to the network equipment 2. In the example of FIG. 4, transmission information 2 includes equipment order information 3 and setting information 4. The setting information 4 includes equipment A setting information, equipment B setting information, and equipment C setting information.

In another example shown in FIG. 5, transmission information 2' includes equipment order information 3, common setting information 5, and individual setting information 6. The individual setting information 6 includes equipment A individual setting information to be set only for the equipment A, equipment B individual setting information to be set only for the equipment B, and equipment C individual setting information to be set only for the equipment C.

Figure 6:
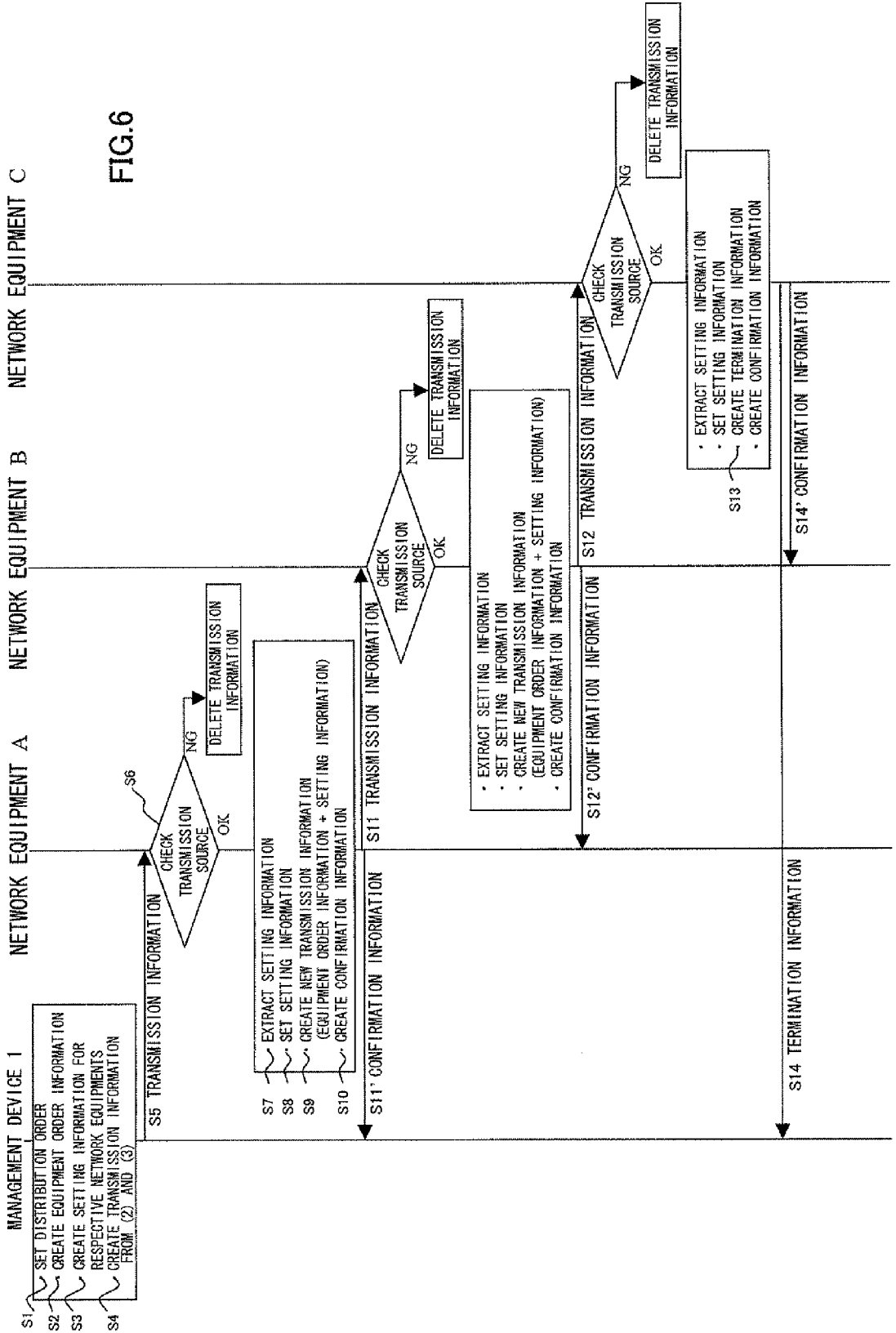
FIG. 6 is a flowchart showing an example of operation of the network equipment management system according to the present invention.

FIG. 6 is a flowchart showing an example of operation of the network equipment management system according to the first embodiment of the present invention. Hereinafter, the flowchart of FIG. 6 is used to describe the flow of data in the network equipment management system.

In the first embodiment, the management device 1 defines the order (order information) of the equipments for which setting information is to be set, creates the setting information to be set for each network equipment 2, and transmits, according to the order information, the created setting information to all the network equipments sequentially therethrough. Each of the network equipments sets the setting information transmitted thereto at least if the setting information has been received from the management device 1 or other network equipment.

First, in the management device 1, the equipment order setting section 12a defines order information, i.e., setting order (in this example, the setting order is set as follows: management device 1→network equipment A→network equipment B→network equipment C→management device 1) (S1). Then, the equipment order information creation section 12c creates the equipment order information 3 required for the management device 1 and network equipment 2 to perform communication according to the defined equipment order (S2), and setting information creation section 12b creates the setting information 4 required for each network equipment to make setting (S3). The created equipment order information 3 and setting information 4 are combined into one transmission information and delivered to the communication processing section 11 (S4). Then, the communication processing section 11 transmits the transmission information 2 having the configuration as shown in FIG. 4 to the network equipment A which is specified as the first transmission destination in the setting order (S5).

In the case where common setting information which is set in common to respective network equipments 2 is included in the setting information, the setting information 4 may be separated into the common setting information 5 and individual setting information 6 to be individually set in the respective equipments. As a result, the transmission information to be transmitted to all the network equipments can be made compact.

Upon receiving the transmission information 2 from the management device 1, the communication processing section 21 of the network equipment A delivers a transmission source identifier for identifying the transmission source (management device, network equipment A, network equipment B, or network equipment C) of the information and received transmission information 2 to the order information processing section 22. In the order information processing section 22, the order information extraction section 22b extracts the equipment order information 3 from the transmission information, and order information confirmation section (determination section) 22a confirms whether the transmission source identifier and actual transmission source coincide with each other or not (S6). In the case where it has been determined that they correspond to each other (S6, OK), the order information processing section 22 delivers the setting information 4 to the information processing section 23. The setting information extraction section 23b of the information processing section 23 extracts equipment A setting information 4a from the setting information 4 (S7), delivers the extracted equipment A setting information 4a to the information setting section 24. The information setting section 24 sets the received equipment A setting information 4a in the network equipment A (S8).

After completion of the setting, the information setting section 24 notifies the order information extraction section 22b of the completion of the setting. Then, the order information extraction section 22b extracts the transmission destination identifier (network equipment B) to which the transmission information is to be transmitted next, delivers a set of transmission destination identifier and transmission information obtained by combining the equipment order information and setting information to the communication processing section 21 (S9). The communication processing section 21 transmits the received transmission information to the network equipment B (S11). In the case where it has been determined that the transmission source identifier and actual transmission source do not coincide with each other (S6, NG), the relevant transmission information is deleted.

The network equipment B that receives the transmission information performs the same operation as the network equipment A. In this manner, the transmission information is sequentially set in the respective network equipments.

After setting the setting information relevant to the equipment A itself, the setting information extraction section 23b of the network equipment A may delete the equipment A setting information 4a, which is setting information relevant to the network equipment A, from the setting information 4 in cooperation with the setting information deletion section 23c. In this case, the communication processing section 21 transmits the transmission information from which the setting information relevant to the equipment A itself has been deleted to the network equipment B. With this configuration, the transmission information becomes gradually smaller in size. Similarly, the order information extraction section 22b may delete the transmission source identifier (in this case, the identifier indicating management device 1) from the equipment order information 3 in cooperation with the order information deletion section 22c.

Further, at the time when transmitting the transmission information to the transmission destination identifier (network equipment B), the network equipment A may transmit confirmation information indicating that the setting of the equipment A itself has been done without any problem to the transmission source or management device 1. With this configuration, reliability of the system can further be increased. For example, in this case, the order information extraction section 22b delivers a set of the transmission source identifier (management device 1) which has been deleted from the equipment order information 3 and confirmation information indicating the completion of the setting of the network equipment A to the communication processing section 21, and the communication processing section 21 transmits the received set to the transmission source identifier (management device 1) (S11').

Further, the network equipment C can determine that it itself is the last network equipment in this system from the equipment order information and thereby creates termination information (S13) and transmits the termination information to the transmission source, i.e., management device 1 (S14).

As an example of operation performed in the case where the confirmation information is used, a case where any fault has occurred in one network equipment on an information transmission route, e.g., the network equipment B will be described with reference to a flowchart of FIG. 7. The operation until the transmission information is transmitted from the network equipment A to network equipment B is the same as that described above.

In the case where the confirmation information is not returned from the network equipment B, to which the network equipment A has transmitted the transmission information, even after a predetermined time period (S21), the network equipment A retransmits the transmission information (S22). In the case where the confirmation information is not returned from the network equipment B even after a predetermined number of times of retransmission, the network equipment A notifies the management device 1 that manages the information throughout the entire network of disconnection information indicating that the confirmation information cannot be acquired from the network equipment B (S23).

Upon receiving the disconnection information from the network equipment A, the management device 1 determines that any fault has occurred in the network equipment B and check whether any problem will occur or not even if new setting information is not set in the network equipment B and whether a current state can be maintained or not (S24). When determining that any problem will not occur, the management device 1 creates skip information allowing the network equipment A to skip the network equipment B in which any fault is determined to have occurred and to transmit the transmission information to the network equipment C (S25) and transmits the skip information to the network equipment A (S26). Upon receiving the skip information, the network equipment A extracts and deletes information concerning the network equipment B from the order information and setting information (S27) to thereby create new transmission information (S28) and transmits the new transmission information to the network equipment C (S29).

The management device 1 that has received the disconnection information may create new transmission information concerning the network equipment subsequent to the network equipment B and transmit the created transmission information directly to the network equipment C which is the next transmission destination. In the case where the settings of the respective network equipments from the first network equipment to the network equipment B need to be set back to their original state, the management device 1 may correspondingly create transmission information and transmit it or may create new setting information, excluding the setting information relevant to the network equipment B and perform setting starting from the network equipment A. Alternatively, the management device 1 may directly try to perform setting for the network equipment B.

Second Embodiment

Figure 8:
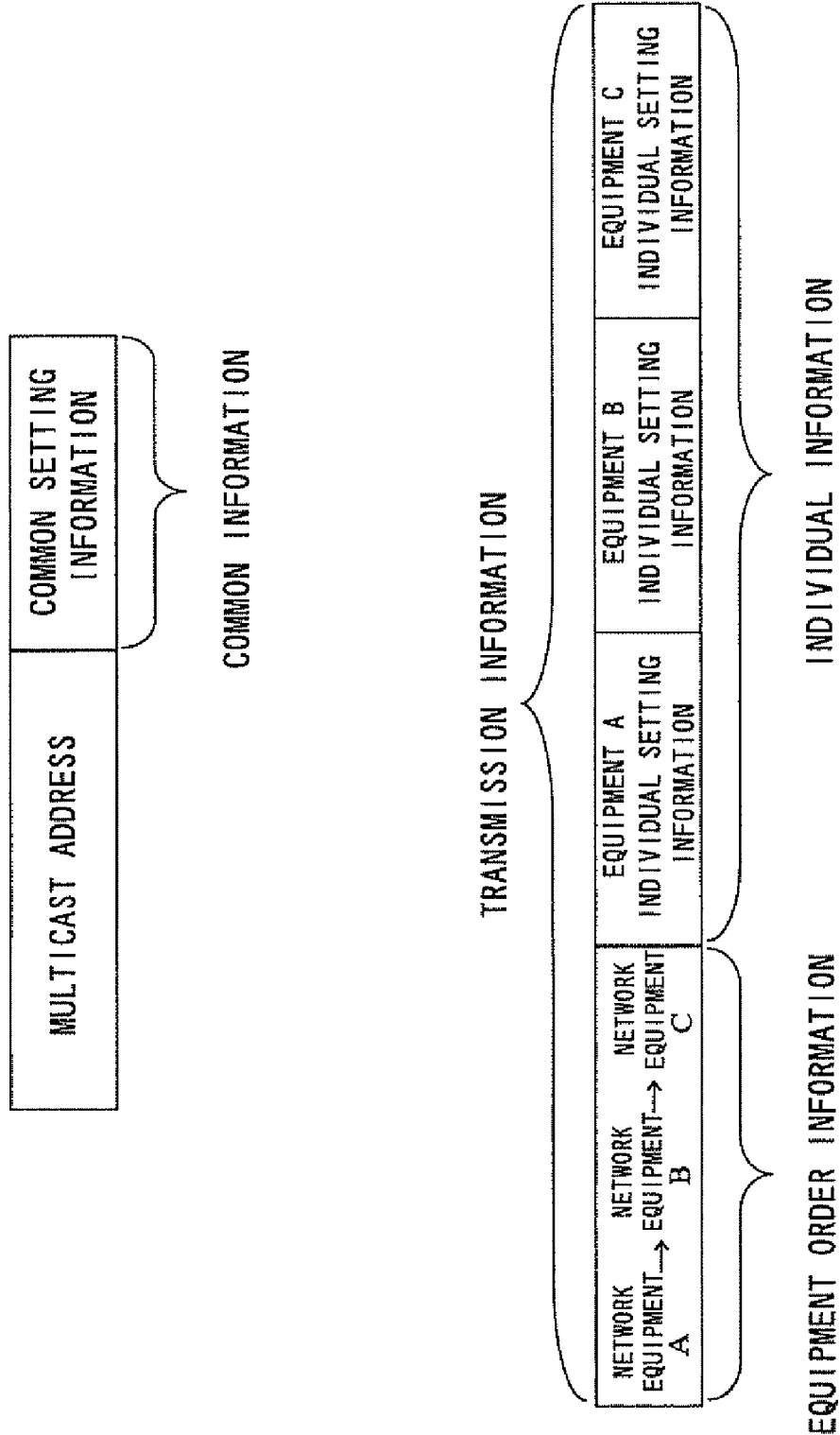
FIG. 8 is a view showing an example of a configuration of transmission information according to the present invention.

Next, a second embodiment of the present invention will be described. A difference from the first embodiment is as follows. As shown in FIG. 8, the management device 1 previously transmits setting information (common information) common to the network equipments in the system, which is included in the transmission information, to all the network equipments by multicast and then transmits only the individual setting information together with the equipment order information. Each of the network equipments updates the setting information after acquiring both the common information and individual information and then transmits the transmission information to the next network equipment. In this case, the individual setting information corresponds to the setting information of the present invention, and communication processing section 11 that transmits the common setting information serves as a common setting information transmission section of the present invention.

Third Embodiment

Figure 9:
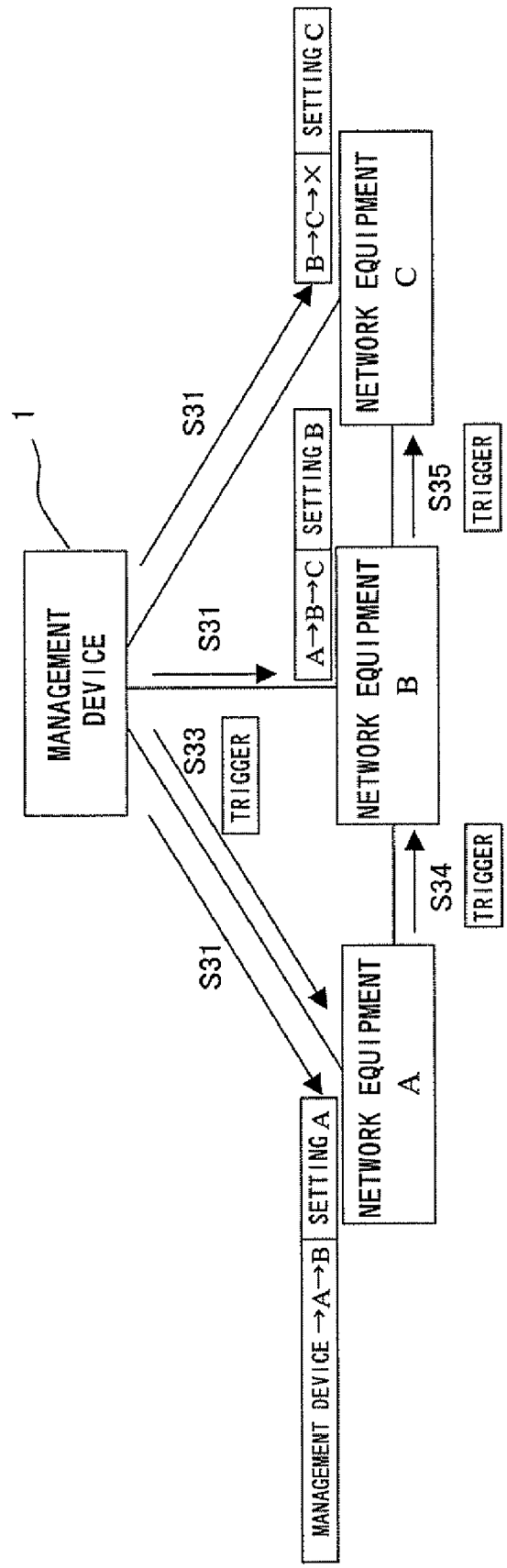
FIG. 9 is a block diagram showing an example of a configuration of the network equipment management system according to the present invention.

Next, a third embodiment of the present invention will be described. FIG. 9 is a view showing a configuration according to the present embodiment.

In the third embodiment, the management device 1 transmits the setting information to respective network equipments at a time and then allows the network equipments to set the setting information according to a predetermined order. In order to set the timing according to the setting order, the management device 1 creates the same order information as that in the first embodiment and transmits, according to the order information, trigger information that specifies the setting timing for the respective network equipments.

The management device 1 transmits trigger transmission timing information (trigger information or timer information) for transmitting the trigger information according to the order information to the first network equipment.

Figure 10:
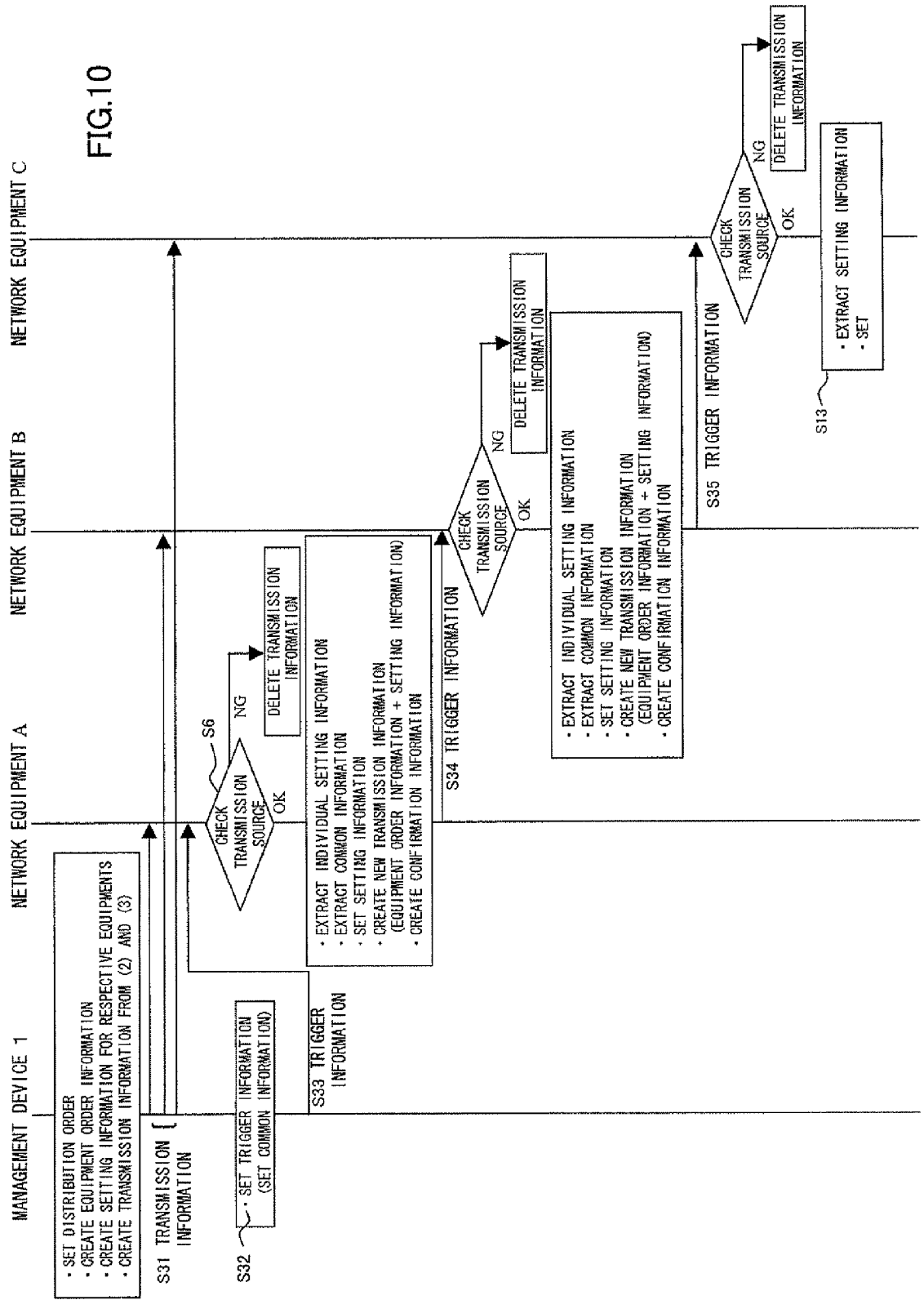
FIG. 10 is a flowchart showing an example of operation of the network equipment management system according to the present invention.

FIG. 10 is a flowchart showing the flow of operation according to the present embodiment. The management device 1 creates the transmission information in a manner similar to the first embodiment. At this time, the management device 1 creates order information that specifies the transmission source and destination of the trigger information for setting (updating) the setting information and setting information of the respective network equipments corresponding to the order information and transmits a set of the order information and setting information to the respective network equipments by multicast as transmission information (S31). Thereafter, after the management device 1 transmits the trigger information to the first network equipment (S33), the respective network equipments update their own setting information if the transmission source of the received trigger information and transmission source defined in the order information coincide with each other and transmit the trigger information to the next network equipment according to the order information. In this case, a determination section that determines the validity of the transmission source of the trigger information based on a coincidence between the transmission source of the trigger information and transmission source defined in the order information is constituted by the order information confirmation section 22a described in the first embodiment.

In this case, as in the case of the first embodiment, the setting information may be separated into the common setting information that can be applied to all the network equipments in the system and individual setting information to be individually set in the respective equipments. In this configuration, the management device 1 may previously transmit the individual information and order information to the respective network equipments and, after an appropriate time interval, transmit the common information to the first network equipment as the trigger information (S32 and S33).

Figure 11:
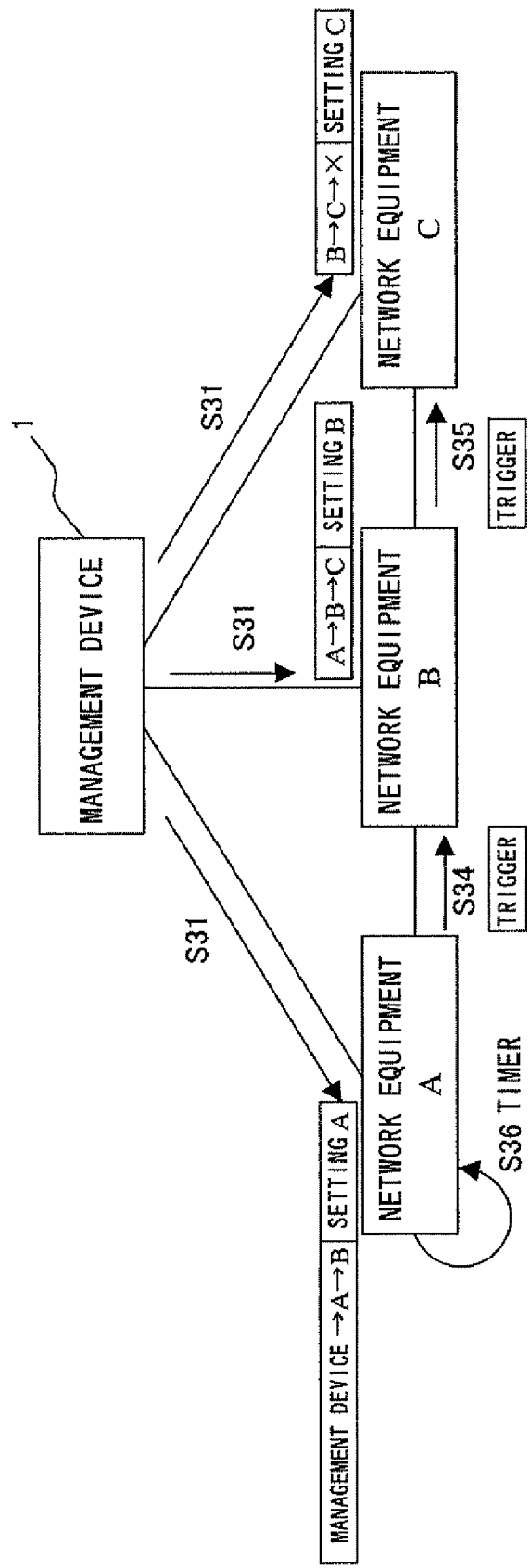
FIG. 11 is a block diagram showing an example of a configuration of the network equipment management system according to the present invention.

Further, as shown in FIG. 11, at the time when transmitting the setting information, the management device 1 may include, as the trigger transmission timing information, information for timer activation (S36) in the start network equipment A. In this case, based on the count result of the timer, the network equipment A starts transmitting the trigger information to the next network equipment after a predetermined time has elapsed from the reception of the setting information (or at a predetermined time).

Fourth Embodiment

As a fourth embodiment of the present invention, an example of a method for establishing a transmission route of transmission information that uses a management tree of a network (network equipment management tree) will be described.

Figure 12:
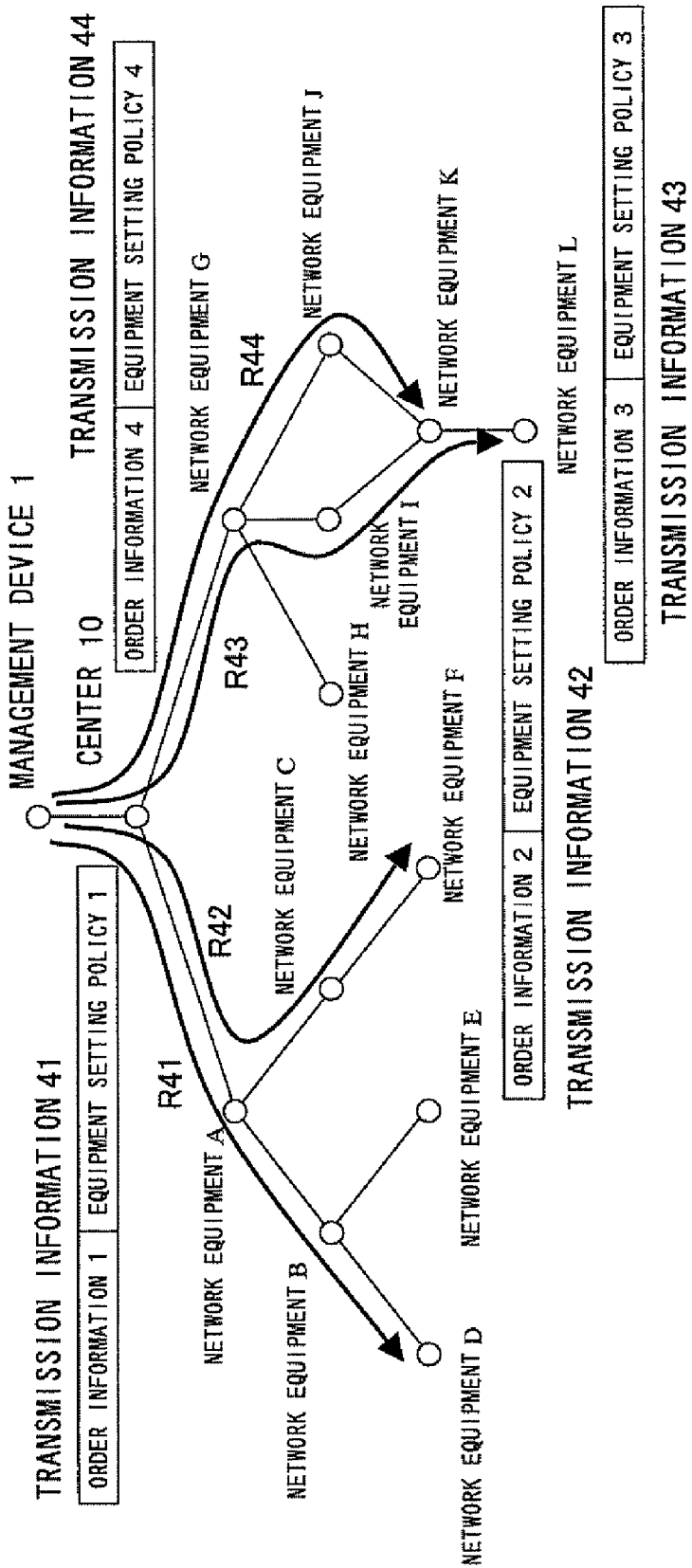
FIG. 12 is a view showing an example of a network equipment management tree and flow of transmission information in the network equipment management system according to the present invention.

FIG. 12 is a view showing an example of a network equipment management tree and flow of transmission information in the network equipment management system according to the present embodiment. FIG. 13 is a view showing a configuration of the transmission information according to the present embodiment. The main structures of the management device 1 and network equipments are the same as those in the first embodiment, and descriptions thereof are omitted here.

In the present embodiment, the management device 1 uses the equipment order setting section 12a to set the distribution order of the setting information according to the network equipment management tree. Then, the management device 1 defines, for respective network equipments through which a plurality of transmission information pass, that one transmission information is used for distribution of the setting information and another transmission information is used for confirmation of version number and notifies the setting information creation section 12b of the above definition and distribution order. According to these information, the setting information creation section 12b creates the setting information for use in the setting to be made in the respective network equipments and setting information confirmation information (including version number) and delivers them, together with the equipment order information that has been created by the equipment order information creation section 12c, to the communication processing section 11 as transmission information. The communication processing section 11 transmits the received transmission information to a center 10 which is the first transmission destination.

The center 10 has the same configuration and performs the same operation as the network equipment described above.

The flow of transmission information in the network equipment management tree shown in FIG. 12 will be described as one example. The setting information of transmission information 41 transmitted along a transmission route R41 includes the setting information of all the network equipments on the transmission route R41, and transmission information 42 transmitted along a transmission route R42 includes confirmation information for the center 10 and network equipment A and setting information for the network equipments C and F. Transmission information 43 transmitted along a transmission route R43 includes information indicating that the network equipment K receives the transmission information from the network equipments I and J. Transmission information 44 transmitted along a transmission route R44 includes information indicating that the transmission information 44 meets another transmission information at the network equipment K. The "version number" mentioned here is used merely for uniquely identifying the setting information, so that time information or the like can be used in place of the version number.

Upon receiving the transmission information 41 from the management device 1, the center 10 operates as follows. The communication processing section 21 delivers a transmission source identifier (in this case, management device 1) and received transmission information to the order information processing section 22. In the order information processing section 22, the order information extraction section 22b extracts the equipment order information from the transmission information, and order information confirmation section 22a determines whether the transmission source identifier and actual transmission source coincide with each other or not. When it has been determined that they coincide with each other, the setting information is delivered to the information processing section 23. In the information processing section 23, the setting information extraction section 23b extracts center setting information from the setting information, and setting information confirmation section 23a confirms whether the version of the center setting information is the latest one or not. When it has been determined that the version is the latest one, the center setting information is delivered to the information setting section 24, where the center setting information is set.

After completion of the setting, the information setting section 24 notifies the information processing section 23 of the completion of the setting. At this time, the setting information confirmation section 23a of the information processing section 23 retains the version of the set information. The setting information extraction section 23b deletes the center setting information from the setting information in cooperation with the setting information deletion section 23c.

The information processing section 23 delivers the information notifying of the completion of the setting and setting information from which the setting information relevant to the center 10 itself has been deleted to the order information processing section 22. Then, the order information extraction section 22b of the order information processing section 22 deletes a data part corresponding to the transmission source identifier (management device 1) from the equipment order information in cooperation with the order information deletion section 22c, extracts the identifier (network equipment A) of the next transmission destination, and delivers a set of transmission information including both the equipment order information and setting information and extracted transmission destination identifier (network equipment A) to the communication processing section 21.

At the same time, the order information processing section 22 delivers a set of the transmission source identifier (management device 1) that has been deleted from the equipment order information and confirmation information notifying of the completion of the setting to the communication processing section 21. According to these sets of information, the communication processing section 21 transmits the transmission information to the transmission destination identifier (network equipment A) and confirmation information to the transmission source identifier (management device 1).

Afterward, the transmission information is sequentially transferred to the network equipment B and network equipment D by the same operation described above.

Next, an example of operation performed in the case where the center 10 has received the transmission information 42 on the transmission route R42 will be described. The operation flow up to the reception of the transmission information and confirmation of the order information performed by the communication processing section 21 and order information processing section 22 is the same as that described above. Upon receiving the setting information from the order information processing section 22, the setting information extraction section 23b of the information processing section 23 extracts center confirmation information from the setting information. Then, the setting information confirmation section 23a determines whether the version of the center setting information is the same as that currently retained (at this time, setting information confirmation section 23a confirms that the transmission source identifier and actual transmission source coincide with each other). When it has been determined that they are the same, the setting information extraction section 23b deletes the center confirmation information from the information section in cooperation with the setting information deletion section 23c and delivers the information notifying of completion of the certification and setting information from which the certification information of the center 10 itself to the order information processing section 22. The subsequent operation flow is the same as that described above. When it has been determined that the version of the center confirmation information differs from that currently retained in the setting information confirmation section 23a, the setting information confirmation section 23a of the information processing section 23 waits until the setting information having the same version number is set, i.e., does not start operation for transmitting the transmission information to the next network equipment in the manner as described above till the setting information having the same version is distributed thereto and set therein.

Next, an example of operation performed in the case where the network equipment K has received the transmission information 43 on the transmission path R43 and transmission information 44 on the transmission path R44 will be described. The communication processing section 21 performs the same reception operation as that described above. Then, in the order information processing section 22, the order information extraction section 22b extracts the equipment order information from the received transmission information, and order information confirmation section 22a confirms whether the transmission source identifier and actual transmission source coincide with each other (whether the transmission source identifier and actual transmission source are the same as each other). Further, at this time, it can be seen that the transmission information will be transmitted from the network equipments I and J, so that the order information processing section 22 waits until the network equipment K receives the transmission information from both the network equipments I and J. When confirming the reception of the transmission information from both the network equipments, the order information processing section 22 notifies the information setting section 23 that both the transmission information has joined together.

The setting information extraction section 23b of the information processing section 23 extracts equipment K setting information/equipment K confirmation information from both the setting information. Then, the setting information confirmation section 23a confirms whether the versions thereof are the same as each other and whether the versions are newer than that currently retained. When the confirmation result is affirmative, the information processing section 23 delivers the equipment K setting information to the information setting section 24 where the equipment K setting information is set. After completion of the setting, the information setting section 24 notifies the information processing section 23 of the completion of the setting. At this time, the setting information confirmation section 23a of the information processing section 23 retains the version of the set information.

The setting information extraction section 23b deletes the equipment K setting information/equipment K confirmation information from the information section in cooperation with the setting information deletion section 23c and, after that, the setting information extraction section 23b delivers the information notifying of the completion of the setting and setting information from which the setting information/confirmation information of the equipment K itself has been deleted to the order information processing section 22.

With regard to the transmission information 43, the order information extraction section 22b of the order information processing section 22 deletes a data part corresponding to the transmission source identifier (in this case, network equipment I) from the equipment order information in cooperation with the order information deletion section 22c, extracts the identifier (network equipment L) of the next transmission destination, and delivers a set of transmission information including both the equipment order information and setting information and extracted transmission destination identifier (network equipment L) to the communication processing section 21. The order information processing section 22 delivers a set of the transmission source identifier (network equipment I) that has been deleted from the equipment order information and confirmation information notifying of the completion of the setting to the communication processing section 21.

According to these sets of information, the communication processing section 21 transmits the transmission information to the transmission destination identifier (network equipment L) and confirmation information to the transmission source identifier (network equipment I). With regard to the transmission information 44, the order information extraction section 22b cannot acquire the identifier of the next transmission destination and therefore the processing for the transmission information 44 is completed at this time point.

Figure 7:
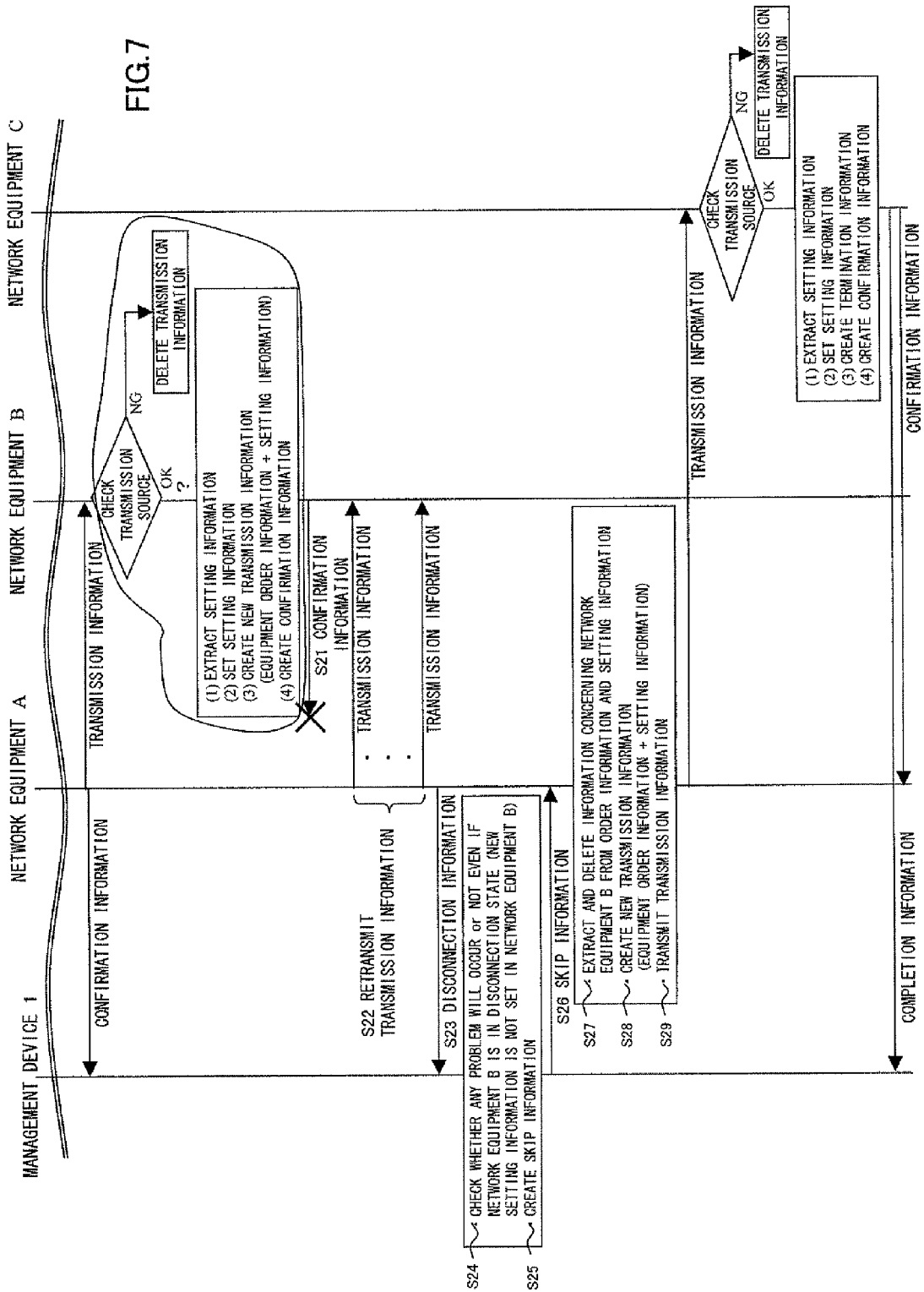
FIG. 7 is a flowchart showing an example of operation of the network equipment management system according to the present invention.

In the case where there occurs any abnormality such as fault in a given network equipment on the transmission path, the same operation as that shown in the flowchart of FIG. 7 (first embodiment) is performed. Further, it goes without saying that common setting information and individual setting information may be combined to form the transmission information as in the case of the first embodiment and that a multicast scheme may be combined as in the case of the second embodiment.

Fifth Embodiment

As a fifth embodiment of the present invention, another example of operation performed in the case where the management tree is utilized will be described.

Figure 14:
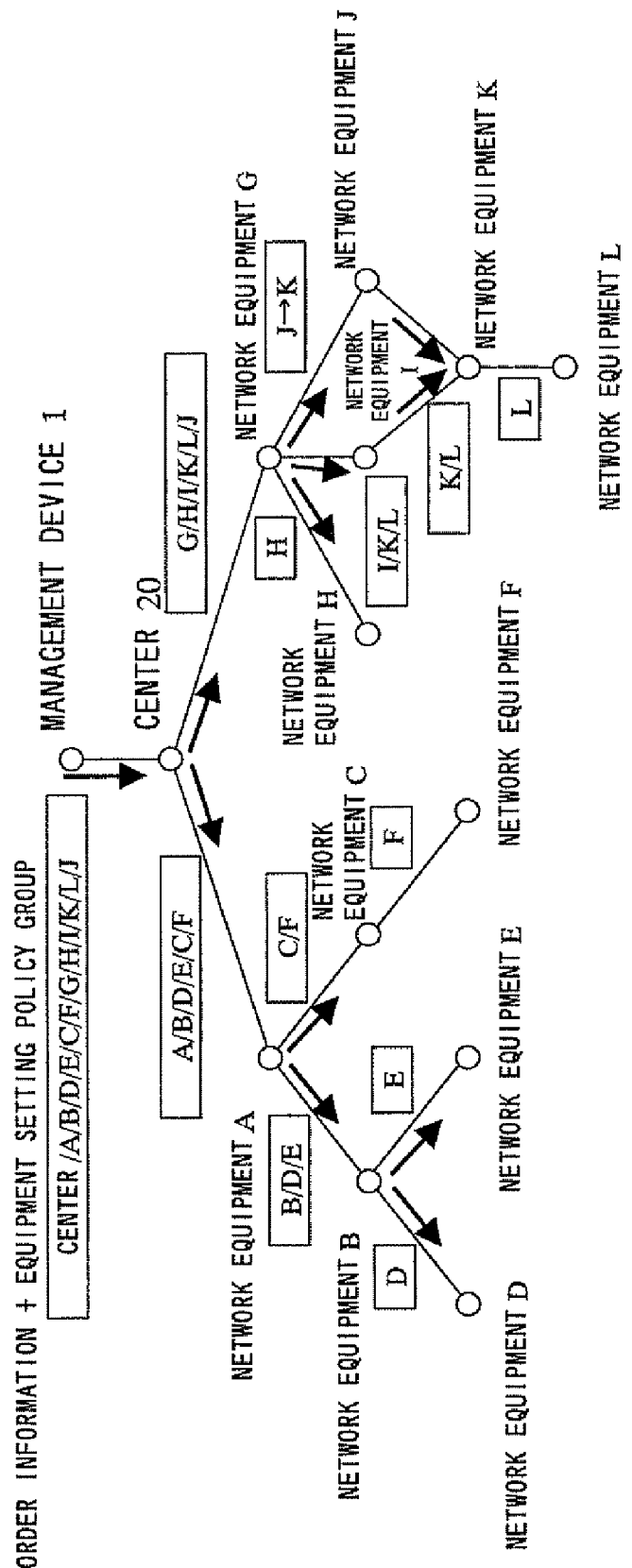
FIG. 14 is a view showing an example of a network equipment management tree and flow of transmission information in the network equipment management system according to the present invention.
Figure 17:
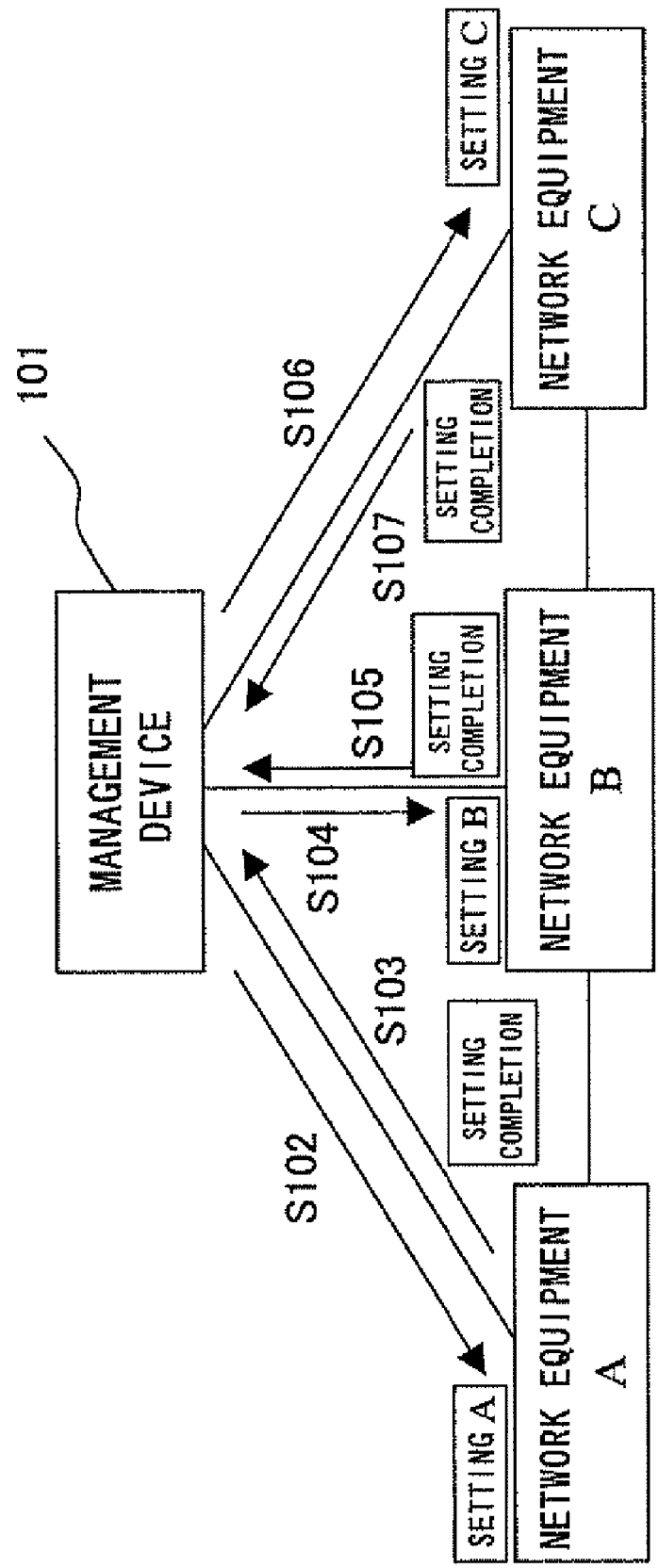
FIG. 17 is a block diagram showing an example of a configuration of a conventional network equipment management system.
Figure 18:
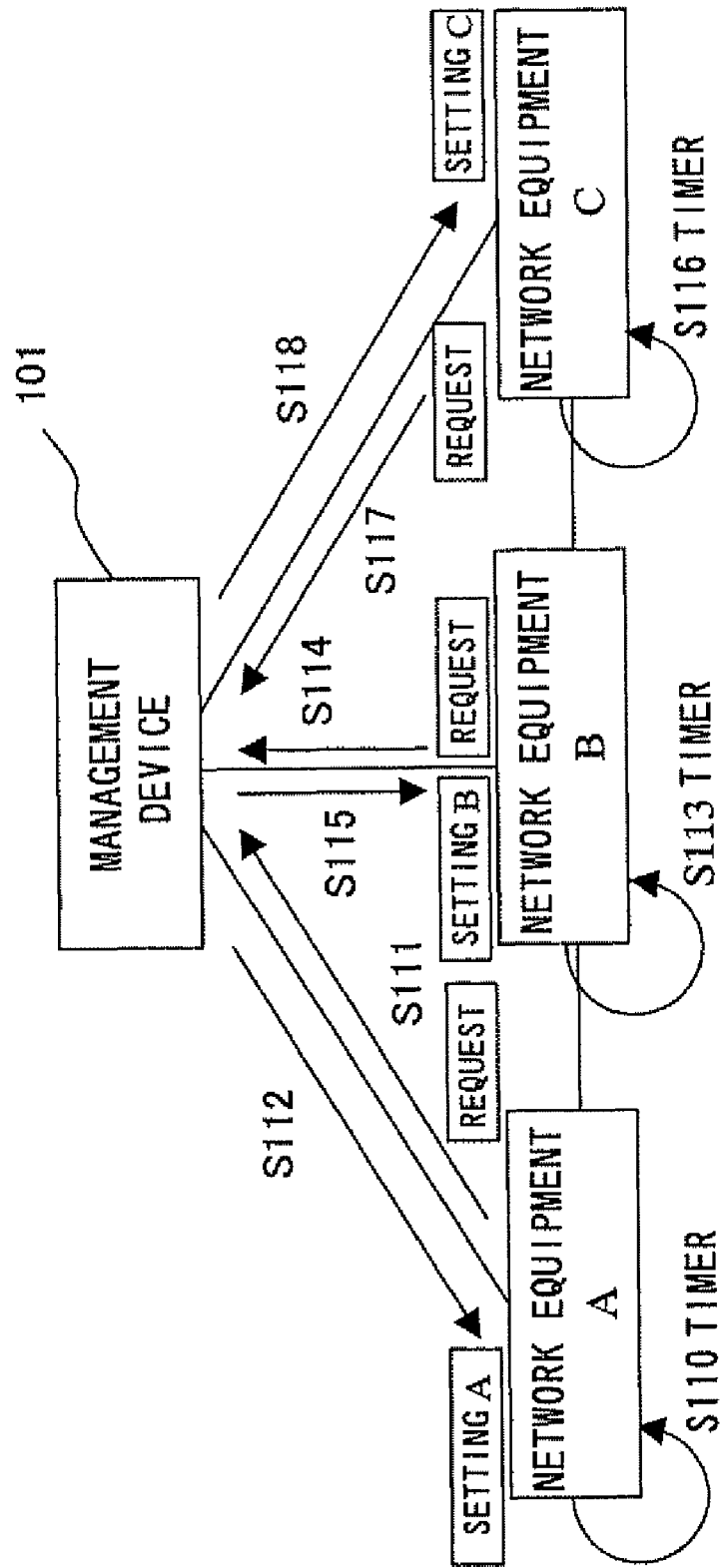
FIG. 18 is a block diagram showing an example of a configuration of a conventional network equipment management system.

FIG. 14 is a view showing a network equipment management tree and flow of transmission information in the network equipment management system according to the present embodiment. FIG. 15 is a view showing a configuration of management information (branch/transmission/merge) according to the present embodiment. FIG. 16 is a view showing a configuration of the transmission information according to the present embodiment.

As in the case of the fourth embodiment, the equipment order setting section 12a of the management device 1 sets the distribution order (branch order) of the setting information according to the network equipment management tree, and equipment order information creation section 12c creates management information (branch/transmission/merge) (FIG. 15) required for managing transmission of the setting information. The setting information creation section 12b creates the setting information for use in the setting to be made in the respective network equipments and delivers a set of the management information and setting information to the communication processing section 11 as transmission information. Upon receiving the transmission information, the communication processing section 11 transmits the received transmission information to the center which is the first transmission destination.

In this case, for example, identifier of equipment at branch point, identifier of next transmission destination equipment, and number of branches at one equipment are set in the management information (branch). Further, identifier of transmission source equipment and identifier of next transmission destination equipment are set in the management information (transmission). Further, identifier of equipment at merge point, identifier of next transmission destination equipment, identifiers of equipments to be merged are set in the management information (merge). Further, depending on the type of the management tree, management information (branch) and management information (merge) may be integrated into one management information (management information (branch/merge)).

For example, in the case of the network equipment management tree shown in FIG. 14, transmission information 51 of FIG. 16 is created in the management device 1 and is transmitted to the first network equipment, i.e., a center 20. The communication processing section 21 of the center 20 receives the transmission information 51 and delivers the transmission information 51 and identifier (management device 1) of the transmission source of the transmission information 51 to the order information processing section 22. The order information extraction section 22b of the order information processing section 22 delivers the part of the information preceding the management information (center branch 2) which is directed to the center 20 itself to the information processing section 23. The data corresponding to the management information (center branch 2) and subsequent information directed to the center 20 are retained in the order information processing section 22.

The setting information extraction section 23b and setting information confirmation section 23a confirm, in cooperation with each other, the version information of the information delivered to the information processing section 23. In the case where the version thereof is the latest one, the information is delivered to the information setting section 24, where the center information is set. After completion of the setting of the information, the information setting section 24 notifies the information processing section 23 of the completion of the setting. Then, the information processing section 23 retains the version of the new information in the setting information confirmation section 23a and notifies the order information processing section 22 of the completion of the setting.

Upon receiving the notification, the order information processing section 22 determines the type (branch, transmission, or, merge) of the transmission information based on the management information (center branch 2) of the data retained. In this case, the type of the transmission information is branch and, therefore, the information up to the next management information (center branch 1) directed to the center 20 itself are combined into one data (data <1>). Then, the order information processing section 22 extracts the identifier (network equipment A) of the next transmission destination in the order information confirmation section 22a based on the management information (center branch 2) and transmits a set of the identifier (network equipment A) and data <1> to the network equipment A through the communication processing section 21.

Similarly, the order information processing section 22 extracts the identifier (network equipment G) of the next transmission destination in the management information of center branch 1 and transmits a set of the identifier and data <2> to the network equipment G through the communication processing section 21. Further, the order information processing section 22 transmits a set of the transmission source identifier (management device 1) delivered first from the communication processing section 21 and confirmation information notifying of completion of the setting to the management device 1 through the communication processing section 21.

In the case where the information type identifier to be transmitted to each network equipment is management information (branch), each equipment performs the information setting, information branch, and information transmission to branch destinations in a manner similar to that described above.

In the case where the information type identifier to be transmitted to each network equipment is management information (transmission) (like the case of network equipments C, I, or J), the information setting section 24 sets the information, and order information processing section 22 transmits data corresponding to the management information (transmission) and subsequent information to the next transmission destination, as in the case where the information type is management information (branch). Further, in the case where there is no data to be transmitted to the next transmission destination (like the case of network equipments D, E, F, H, or L), termination information is transmitted to the management device 1.

In the case where the information type identifier to be transmitted to each network equipment is management information (merge) (like the case of a network equipment K) or where the management information (transmission) includes merge information, the order information processing section 22 waits until the transmission information from identifiers of the network equipments whose management information (merge) are to be merged are collected. Upon receiving the transmission information from all the network equipments (in this case, network equipments I and J) to be merged, the order information processing section 22 delivers the information preceding the management information (merge) to the information processing section 23. The subsequent operation is the same as that in the case where information type identifier is management information (branch).

Also in the fifth embodiment, like the fourth embodiment, common setting information and individual setting information may be combined to form the transmission information as in the case of the first embodiment and that a multicast scheme may be combined as in the case of the second embodiment.

According to the above embodiment described above, it is possible to provide a program that allows computers constituting the network equipment management device and network equipments to execute the above steps as a network equipment management program. By storing the above program in a computer-readable storage medium, it is possible to allow the computer constituting the network equipment management device to execute the program. The computer-readable storage medium mentioned here includes: a portable storage medium such as a CD-ROM, a flexible disk, a DVD disk, a magneto-optical disk, or an IC card; a database that holds computer program; another computer and database thereof; and a transmission medium on a network line.

INDUSTRIAL APPLICABILITY

As described above in detail, according to the present invention, it is possible to perform information setting with high reliability while preventing occurrence of an error in the setting order, reducing a load on the management device, and reducing the time required to complete the information setting.

The invention claimed is:

1. A network equipment management device connected to a plurality of network equipments through a network, the device comprising:
   a transmission information creation unit that creates transmission information which includes setting information and order information, the setting information including respective information for the plurality of network equipments, the order information specifying order of the plurality of network equipments in which corresponding respective information of the setting information is to be set in response to reception of trigger information; and
   a transmission unit that transmits the transmission information created in the transmission information creation unit to the plurality of network equipments by multicast, and transmits the trigger information to a first network equipment specified in the order information through the network, the trigger information being sequentially transmitted from N (N=1, 2, . . . )-th network equipment to (N+1)-th network equipment according to the order of the plurality of network equipments, wherein
   each of the plurality of network equipments activates a timer in response to reception of the trigger information, and transmits the trigger information to a destination network equipment according to the order information based on a count result of the timer.

2. A computer-readable, non-transitory storage medium having recorded thereon a network equipment management program that causes a computer connected to a plurality of network equipments through a network, to execute a process comprising:
   creating transmission information which includes setting information and order information, the setting information including respective information for the plurality of network equipments, the order information specifying order of the plurality of network equipments in which corresponding respective information of the setting information is to be set in response to reception of trigger information;
   transmitting the transmission information including the order information created in the creating to the plurality of network equipments by multicast, and
   transmitting the trigger information to a first network equipment specified in the order information through the network, the trigger information being sequentially transmitted from N (N=1, 2, . . . )-th network equipment to (N+1)-th network equipment according to the order of the plurality of network equipments, wherein
   each of the plurality of network equipments activates a timer in response to reception of the trigger information, and transmits the trigger information to a destination network equipment according to the order information based on a count result of the timer.

3. A network equipment connected to a network, the equipment comprising:
   a communication processing unit that receives transmission information through the network and receives trigger information after reception of the transmission information, the transmission information including setting information and order information, the setting information including respective information for a plurality of network equipments, the order information specifying order of the plurality of network equipments;
   a determination unit that determines whether or not a source of the trigger information based on the order information; and
   an information setting unit that sets respective information of the setting information corresponding to the network equipment in the network equipment when the source of the trigger information is valid, wherein
   the communication processing unit activates a timer in response to reception of the trigger information and transmits the trigger information to a destination network equipment according to the order information based on a count result of the timer.

4. A computer-readable, non-transitory storage medium having recorded thereon an information setting program that causes a computer connected to a network to execute a process comprising:
   receiving transmission information through the network and trigger information after reception of the transmission information, the transmission information including setting information and order information, the setting information including respective information for a plurality of network equipments, the order information specifying order of the plurality of network equipments;
   determining whether or not a source of the trigger information based on the order information;
   setting respective information of the setting information corresponding to the network equipment in the network equipment when the source of the trigger information is valid;
   transmitting the trigger information to a destination network equipment according to the order information;
   activating a timer in response to reception of the trigger information; and
   transmitting the trigger information to a destination network equipment according to the order information based on a count result of the timer.

5. A system comprising:
   a plurality of network equipments; and
   a network equipment management device that sets setting information to the plurality of network equipments, wherein
   the network equipment management device includes
      a communication processing unit that transmits first order information which indicates an order relationship among the network equipment management device and the plurality of network equipments and designates the network equipment management device as a first, to a first network equipment next to the network equipment management device in the order relationship, and
   the first network equipment includes:
      a reception unit that receives the first order information; and
      a transmission unit that transmits second order information, which designates the first network equipment as a first and is relative to the plurality of network equipments according to the order relationship, to a second network equipment next to the first network equipment in the order relationship, after setting processing which is executed in the first network equipment and is executed when a reception of the first order information from the network equipment management device which is designated as the first by the received first order information is detected, the second order information not including the network equipment management device which is designated as the first by the first order information, as the first; wherein the transmission unit of the first network equipment creates the second order information based on the first order information.

6. The system according to claim 5, wherein
the network equipment management device transmits the setting information to the plurality of network equipments by multicast, and
the first network equipment executes the setting processing based on the setting information.

7. The system according to claim 5, wherein when there is a branch in a network equipment management tree which indicates connection of the plurality of network equipments on a network, the network equipment management device creates the first order information and other order information in correspondence with a plurality of routes formed by the branch.

8. The system according to claim 5, wherein the first order information includes at least one of branch information and merge information, the branch information is concerned with a network equipment installed at a branch point in a network equipment management tree and branch definition, and the merge information is concerned with a network equipment installed at a merge point in the network equipment management tree and merge definition.

9. A method which is applied to a system including a plurality of network equipments and a network equipment management device that sets setting information to the plurality of network equipments, the method comprising:
the network equipment management device transmitting first order information, which indicates an order relationship among the network equipment management device and the plurality of network equipments and designates the network equipment management device as the first, to a first network equipment next to the network equipment management device in the order relationship;
the first network equipment receiving the first order information; and
the first network equipment transmitting second order information, which designates the first network equipment as the first and is relative to the plurality of network equipments according to the order relationship, to a second network equipment next to the first network equipment in the order relationship, after setting processing which is executed in the first network equipment and is executed when a reception of the first order information from the network equipment management device which is designated as the first by the received first order information is detected, the second order information not including the network equipment management device which is designated as the first by the first order information, as the first; the first network equipment creating the second order information based on the first order information.

10. The method according to claim 9, further comprising:
the network equipment management device transmitting the setting information to the plurality of network equipments by multicast; and
the first network equipment executing the setting processing based on the setting information.

11. The method according to claim 9, wherein when there is a branch in a network equipment management tree which indicates connection of the plurality of network equipments on a network, the network equipment management device creates the first order information and other order information in correspondence with a plurality of routes formed by the branch.

12. The method according to claim 9, wherein the first order information includes at least one of branch information and merge information, the branch information is concerned with a network equipment installed at a branch point in a network equipment management tree and branch definition, and the merge information is concerned with a network equipment installed at a merge point in the network equipment management tree and merge definition.

* * * * *